Figure 1:
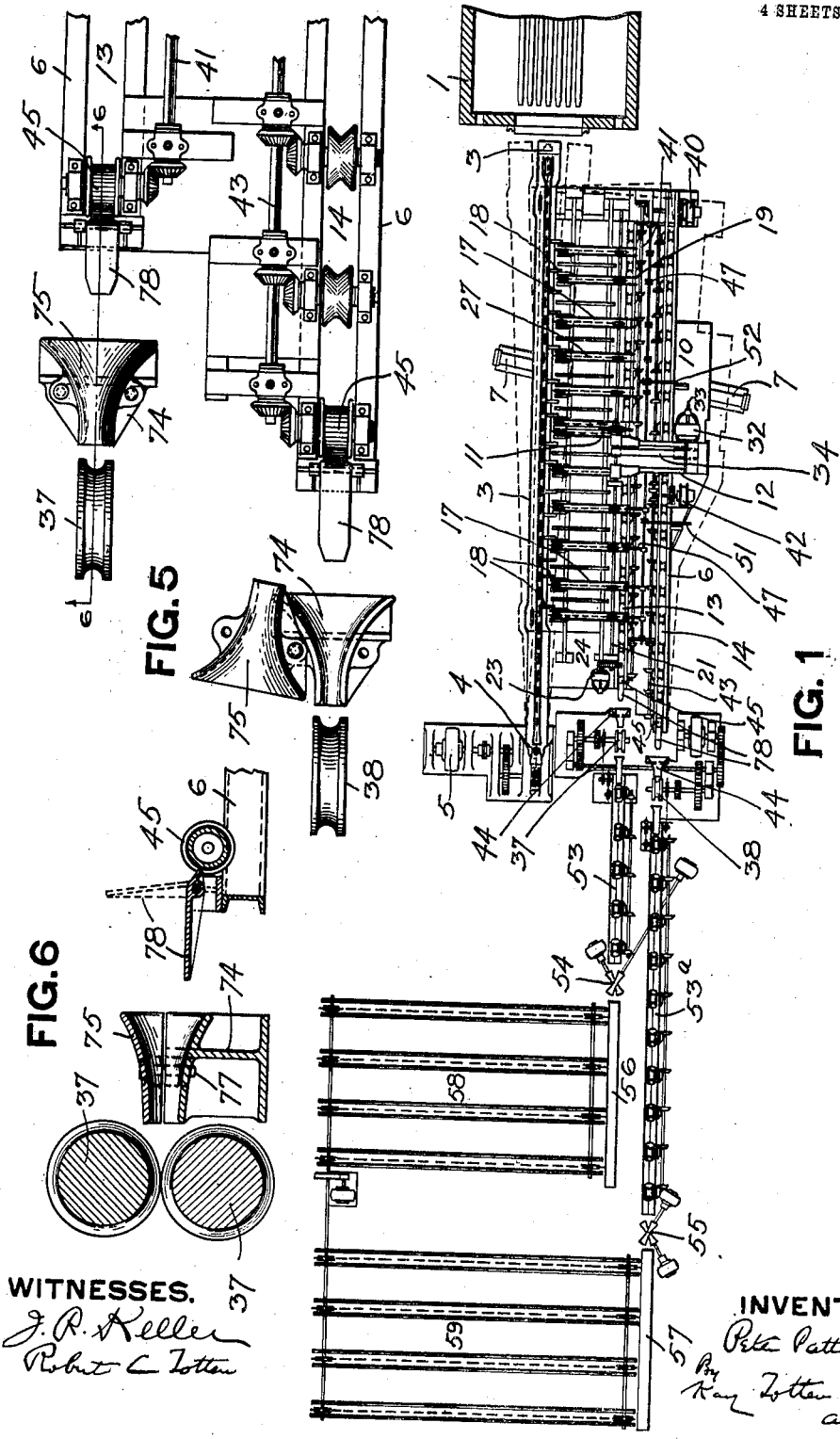

No. 826,189. PATENTED JULY 17, 1906.
P. PATTERSON.
TUBE WELDING AND FINISHING APPARATUS.
APPLICATION FILED JUNE 3, 1905.

4 SHEETS—SHEET 1.

WITNESSES.
INVENTOR.

No. 826,189.

PATENTED JULY 17, 1906.

P. PATTERSON.
TUBE WELDING AND FINISHING APPARATUS.
APPLICATION FILED JUNE 3, 1905.

4 SHEETS—SHEET 3.

WITNESSES.
J. R. Keller
Robert C. Totter

INVENTOR.
Peter Patterson
By Kay Totter & Wiater
attorneys

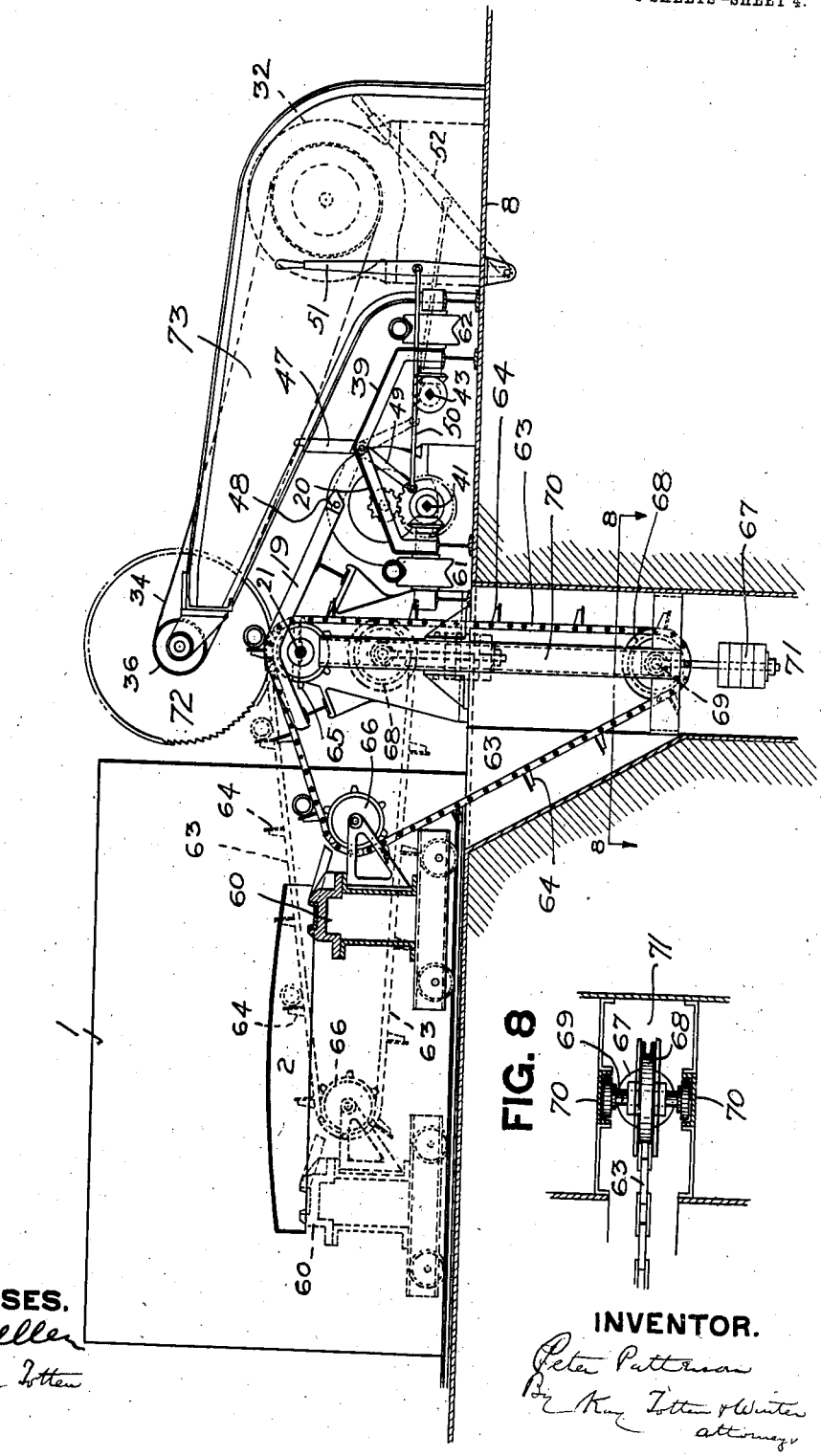

UNITED STATES PATENT OFFICE.

PETER PATTERSON, OF McKEESPORT, PENNSYLVANIA, ASSIGNOR TO NATIONAL TUBE COMPANY, OF PITTSBURG, PENNSYLVANIA, A CORPORATION OF NEW JERSEY.

TUBE WELDING AND FINISHING APPARATUS.

No. 826,189.  Specification of Letters Patent.  Patented July 17, 1906.

Application filed June 3, 1905. Serial No. 263,645.

*To all whom it may concern:*

Be it known that I, PETER PATTERSON, a resident of McKeesport, in the county of Allegheny and State of Pennsylvania, have invented a new and useful Improvement in Tube Welding and Finishing Apparatus; and I do hereby declare the following to be a full, clear, and exact description thereof.

My invention relates to apparatus for the manufacture of tubing, being particularly though not exclusively applicable to the finishing of tubing welded from blanks of multiple standard length. It is found that delays are liable to occur in finishing such tubing welded in multiple lengths, principally because the tubing is welded more rapidly than it can be cross-rolled, while for certain smaller sizes it is necessary that the multiple-length tube be cut to the ordinary standard length before it is cross-rolled, as the twisting or centrifugal action in cross-rolling is liable to injure or mar a small tube of as great length as thirty-eight (38) or more feet.

The present invention provides suitable means for the cutting of the multiple-length tubes into shorter sections immediately after welding in connection with their transfer from the welding apparatus to the finishing-rolls and the automatic feeding of the tube-sections so formed to different roll passes for sizing, cross-rolling, or other finishing operations, making the entire operation automatic and providing for the cutting of the multiple-length tubes into sections without stoppage in their movement or the necessity of any delay in such operation dependent on the movements of the tube-sections formed from tubes previously welded.

To these ends the invention consists, generally stated, in the combination of a welding-furnace, welding apparatus in front thereof, finishing-rolls, and a trough leading thereto at the side of the welding apparatus, power-driven lateral transfer mechanism between the welding apparatus and the trough, and a saw located in the course of said lateral transfer mechanism.

It also consists in the combination of laterally-moving welding apparatus with such power-driven lateral transfer mechanism and the saw located in the course of such transfer mechanism between the welding apparatus and the rolls.

It also consists in the employment of such saw supported on the carriage or laterally-moving frame on which the welding apparatus is supported.

It also consists in the employment of a pivoted laterally-moving frame carrying the welding apparatus and the saw, as well as the troughs leading to the finishing-rolls, and means for feeding the severed tube-sections to said troughs, as well as other improvements which will be hereinafter described and claimed.

To enable others skilled in the art to make and use my invention, I will describe the same more fully, referring to the accompanying drawings, in which—

Figure 2:
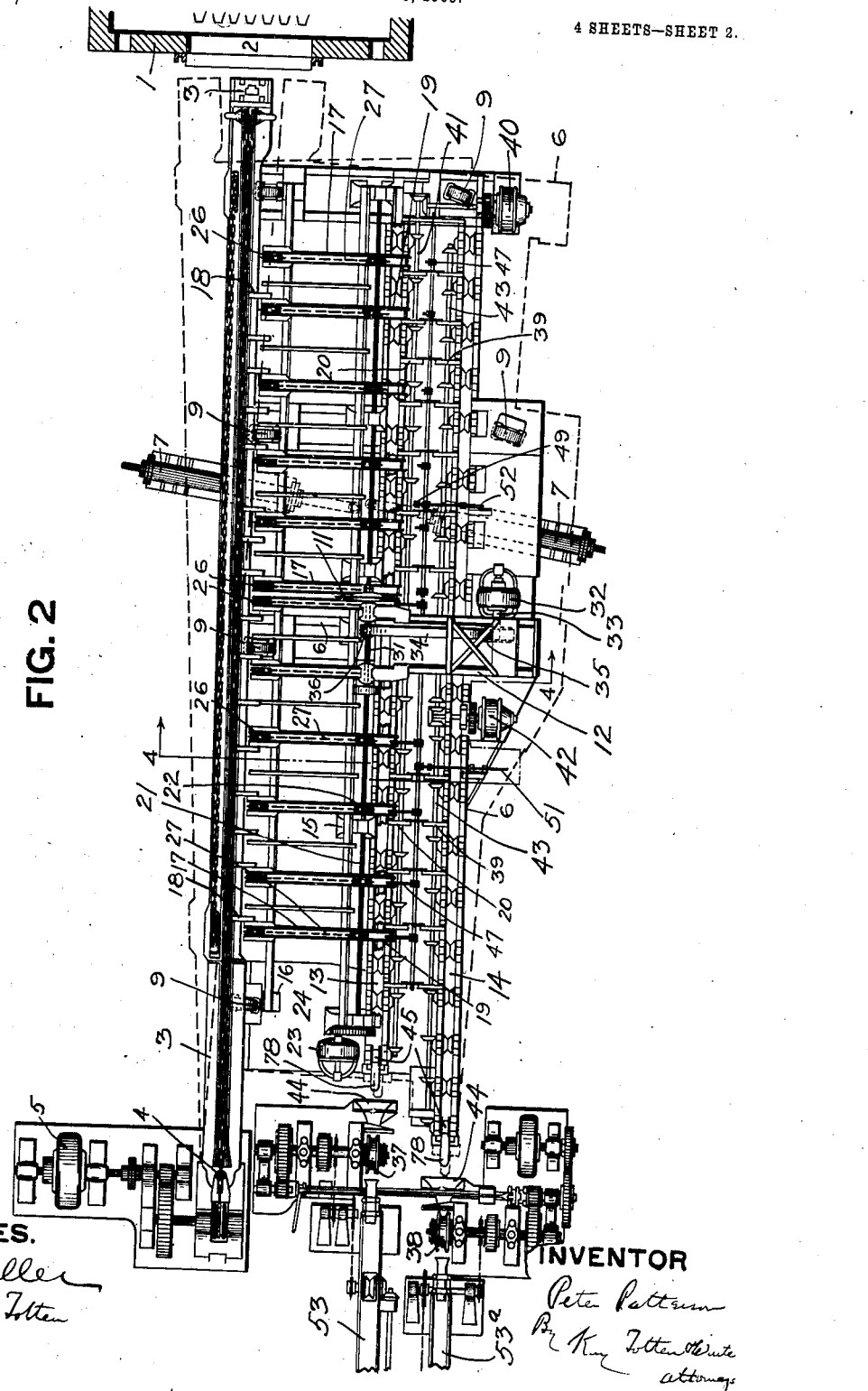
Figure 3:
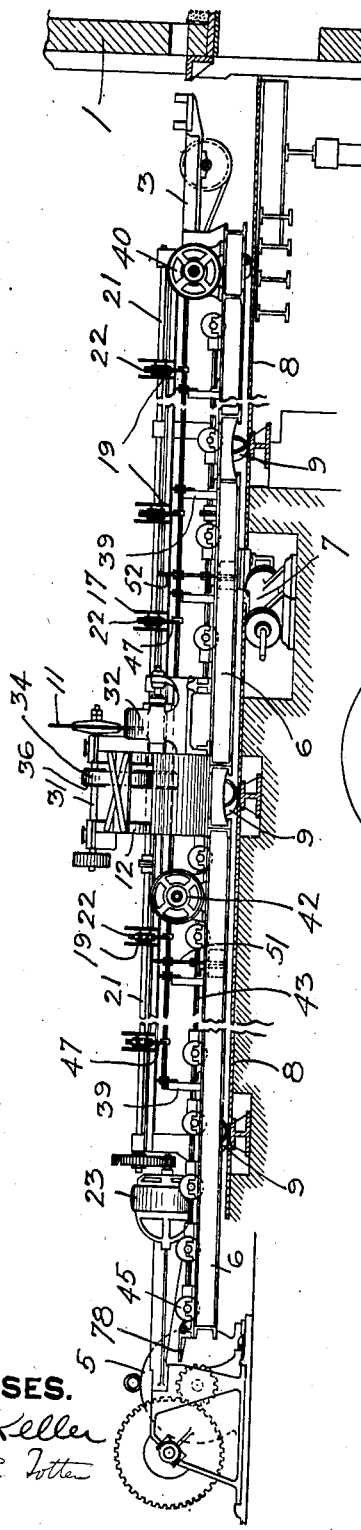
Figure 4:
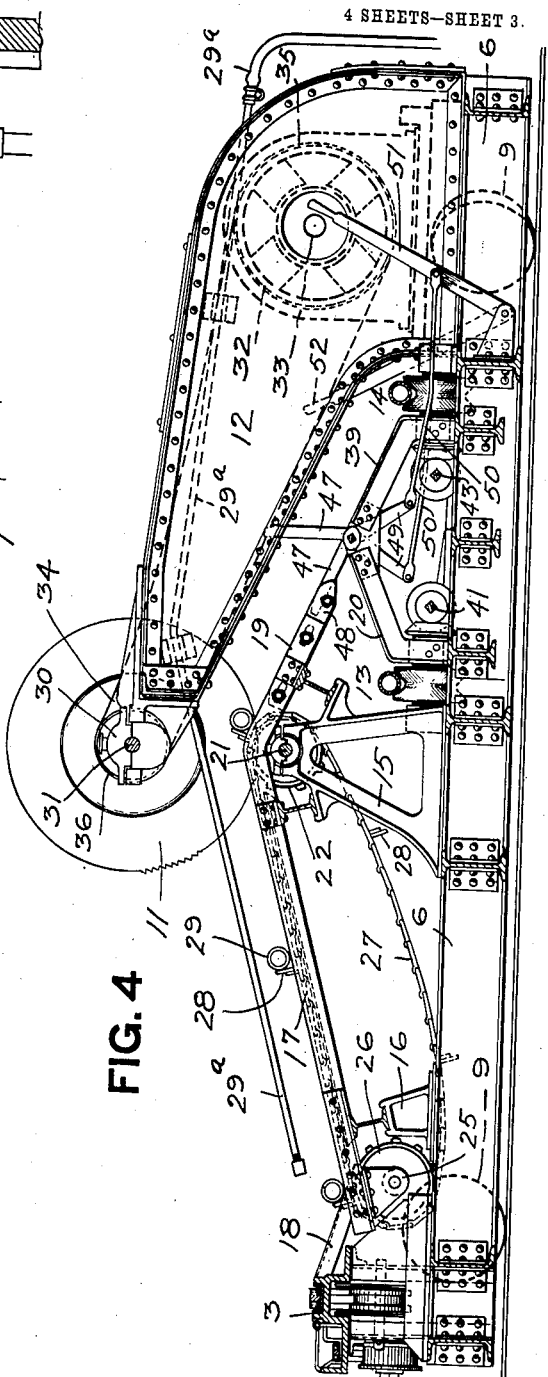

Figure 1 is a diagrammatic plan view of apparatus embodying the invention. Fig. 2 is a similar view, on an enlarged scale, of the main portion thereof. Fig. 3 is a side view of the portion shown in Fig. 2. Fig. 4 is an enlarged cross-section on the line 4 4, Fig. 2, looking in the direction of the arrow. Fig. 5 is a plan view, on a still larger scale, of the sizing-rolls, guiding-funnels, and rear ends of the feeding-troughs. Fig. 6 is a vertical section on the line 6 6, Fig. 5. Fig. 7 is a cross-section illustrating a modification of the invention wherein the saw is mounted in a stationary or non-traveling frame and used in connection with a bodily-movable bench; and Fig. 8 is a detail horizontal section on the line 8 8, Fig. 7.

While parts of my invention may be employed for the manufacture of either butt or lap weld tubing and for any suitable single or multiple length of tubing and with any suitable welding apparatus, it will be described in connection with the manufacture of double-length butt-weld tubing on a pivoted draw-bench, as that is considered the preferable form.

The welding-furnace 1 is of suitable construction and length for heating the strips or other shaped blanks for welding into the desired multiple-length tubing, said furnace having the mouth or opening 2, through which the blanks are fed from the furnace to the welding apparatus 3. I have illustrated in Fig. 1 and prefer to employ the chain-draw bench for making butt-weld tubing pivoted at its rear end at 4 and having its draw-chain driven from a suitable motor 5 through suitable gearing.

In the construction illustrated in Figs. 1 to 4 the welding apparatus and other apparatus hereinafter referred to are all supported upon the frame 6, pivoted at 4 and moved laterally by suitable hydraulic cylinders 7, this frame or carriage being supported on the mill-floor 8 by suitable wheels or rollers 9, all mounted on radial lines from the pivotal point 4 at the rear of the frame. This frame is shown as built up of suitable structural shapes. In addition to the draw-bench 3 this frame carries the power-driven transfer mechanism 10, the saw 11, with its plate-girder frame 12 and two sets of roll-feeding troughs 13 and 14, and also suitable motors for driving the different parts, so that, as illustrated in the different figures, a wide strong frame is required.

The form of power-driven transfer mechanism preferred by me is an endless chain, the construction of which is made clear in Fig. 4. Supported on the standards 15 and 16 are a series of inclined bars 17, which extend upwardly from the skids 18, leading down from the draw-bench, these bars 17 being shown as carried to the top of the standards 15 to deliver the tubes to the downwardly-inclined bars 19 on the other side thereof leading to the finishing-troughs, as hereinafter referred to. Mounted at the top of the standards 15 is the power-shaft 21, carrying the sprocket-wheels 22, this shaft being driven by a motor 23, illustrated as supported on a platform 24, extending out from the frame 6. Between the sprocket-wheels 22 and the draw-bench mounted in suitable bearings 25 are the sprocket-wheels 26. Endless traveling transfer-chains 27 are mounted on these sprocket-wheels 22 and 26 and are provided with carrying-lugs 28, these chains lying between adjacent inclined bars 17 and the carrying-lugs 28 being arranged in line, so as to carry the welded double-length tubes (illustrated at 29) upwardly along the inclined bars 17.

As shown in Fig. 2, the transfer-chains on each side of the saw 11 are located close to the saw, so as to support the pipe during sawing close to the saw, the pipe being carried by the transfer-chains into contact with the rapidly-traveling saw and past the same without stopping and in regular course to the feeding-troughs and being delivered by suitable guides into either feeding-trough 13 or 14, as the case may be, so that the pipe immediately after welding and in its course of travel to the finishing-rolls is cut into sections, and these sections are delivered automatically by suitable guides in position for feeding to the sizing or other finishing rolls. In order to prevent the saw from crushing or otherwise injuring the tube while it is still comparatively hot and soft, it is preferred to cool the latter before sawing. This can be conveniently done by blowing onto that portion of the tube which comes under the saw a cooling medium, such as air or water. For this purpose I have shown a pipe 29, extending over the chain-carrier and substantially in line with the saw. This pipe is perforated for the escape of the cooling medium, so that as the pipes travel from the draw-bench toward the saw they will be cooled at that portion where they are to be cut.

The saw for cutting the pipe may be supported in any suitable way in the course of the transfer mechanism. I have illustrated the preferable way of carrying the same in Figs. 1 to 4, the saw itself being mounted on the traveling frame or carriage 6 and supported in strong frames or housings 12, resting on and connected to the frame 6 beyond the outer feed-roll trough 14 and projecting above the feed-roll troughs into position to support the saw above and in the course of the endless-chain transfer mechanism 27. This frame 12 is illustrated as built up of two heavy metal plates with angle-bars at the edges and form practically plate-girders. The housing 12 is connected to the structural-steel frame 6 and suitably braced and carries at its outer end the bearings 30, in which is mounted the shaft 31, carrying the saw 11, this saw being driven by a motor 32, located on the main frame 6, and the saw being illustrated as driven directly from the motor-shaft 33 by belting 34, passing over the pulleys 35 and 36. The saw-frame 12 holds the saw in fixed position with relation to the lateral transfer mechanism, which carries the tubing into contact with and past the saw, as above described. The saw-frame 12 is secured to the carriage-frame 6 beyond both feeding-troughs and overhanging the same to provide for cutting the heated tube before it reaches either feed-trough and to give the tube-sections free course to both troughs without interference of the saw-frame.

The feed-troughs 13 and 14, as illustrated in Figs. 1 to 3, are arranged to feed the tubing into any suitable finishing-rolls—for example, into the sizing-rolls 37 and 38—the apparatus being illustrated with two sets of sizing-rolls arranged in parallel relation in order to receive and roll the two separate tube-sections as soon as the same are cut from the double-length tube and fed thereto from the feed-troughs. I have illustrated these feed-troughs as formed of a series of feed-rollers which give the entire support to the tube-sections. The feed-rollers of the trough 13 are driven continuously in one direction by a suitable motor 40 through a suitable shaft 41 and bevel-gear connections extending for the length of the whole train of rolls. In like manner the feed-rolls of the trough 14 are driven by a motor 42, which connects by suitable gearing through one of the feed-rollers of the trough with the shaft 43, which drives the remaining feed-rollers through suitable bevel-gear connections. The feed-rolls are normally driven at regular speed, so as to feed the tube-sections as soon as they drop into the troughs forward into the sizing-rolls. As the sizing-rolls are stationary and the feeding-roll troughs are supported on the frame 6, as illustrated in the Patterson and Boax patent, No. 715,853, of December 16, 1902, I employ in front of the sizing-rolls the funnels 44. These funnels are mounted on stationary frames directly in front of the sizing-rolls and act to direct the tube from the trough into the sizing-rolls. It is found that by such construction the tube, even though it be drawn out of shape when in its hot flexible condition, will be easily bent into line with and fed into the sizing-rolls. To allow the tube to take a more gradual bend when the trough is swung out of line with the rolls, the end roller 45 of the feeding-troughs is provided with a wide groove, as shown. Each funnel is preferably formed in two sections 74 75, as shown in Figs. 5 and 6, divided on a horizontal line and loosely held together by means of long bolts or pins 77, extending through suitable perforated ears formed on the two sections. This enables the upper section of the funnel to be quickly raised from the lower and swung to one side in case a tube should stick therein, the long bolts permitting such action. To insure the feeding of the tube-sections from the troughs into said funnels, I employ at the end of each feeding-trough a projecting apron-plate 78, which will prevent the front end of the tube from sagging down between the last feeding-roller and the funnel. These apron-plates preferably are pivoted, so that they can be swung out of the way, as shown in Fig. 6, in order to permit the workmen to pass between the sizing-rolls and feed-troughs when necessary to get at different parts of the apparatus.

Any suitable guides may be provided for directing the tube-sections into the feed-troughs 13 or 14 after the double-length tube has been cut into sections, as above described. For that purpose I prefer the mechanism illustrated in the drawings, consisting of a series of downwardly-inclined bars or guides 19, onto which the tubes are delivered by the power-driven transfer mechanism 10. In line with the inclined bars 19 are the inclined bars 39, which when the pivoted extensions or switch-guides 47 thereof are lowered into line with the guides 19 form a continuous gradually-inclined guideway to the outer trough 14. Extending from the point of pivoting of the switch-guides 47 toward the trough 13 are the guides 20, the construction being such that the tube-section may either roll down the guides 19 over the switch-guides 47 onto the guides 39 and to the trough 14, or when that switch is raised, as shown in full lines, Fig. 4, and to the right in Fig. 2, the tube will roll down the inclines 19 and be directed by the raised switch-guides 47 onto the guides 20 and will roll down the same to the trough 13. It will be seen that these guides 19, 20, and 39 are made on gradual inclines. This is important, as it prevents injury to the highly-heated tube in its passage to the troughs, delivering such tube to the troughs without injury or denting thereof, as might be the case where it drops down an abrupt incline. For example, in feeding to the trough 13 it passes down the guides 19 and then in reverse course along the guides 20 into the trough, or if feeding to the trough 14 it passes in continuous course along the guides 19, 47, and 39 into the trough 14. It will be noted that the guides 19 are made extensible, the extension-bars 48 having slots formed therein and being bolted to the guides 19, so that these extensions 48 may be projected beyond the lower ends of the normal guides 19 and carry the tubes sufficiently close to the tops of the guides 20 to prevent any injury thereto as they drop from the guides 19 onto the guides 20 in their course to the trough 13. As illustrated in Figs. 2 and 4, the switch-guides 47 are pivoted at the apex or meeting-point of the guides 20 and 39 and have extending below the same the bell-crank levers 49, connected by suitable straps 50 to the hand-levers 51. The sets of switch-guides 47 on one side of the saw are connected to one such lever, and the set of switch-guides on the other side of the saw connect to another such lever 52, so that in the running of the apparatus the workmen in charge can raise or lower these switch-guides and direct the tube-sections into either trough, the apparatus being thus under full control, so that in case of stoppage or delay in one finishing-mill by the mere movement of one of these levers the tube-sections formed from a double-length tube can both be fed through the other finishing-mill and the mill kept running continuously.

In employing the apparatus, as illustrated in Figs. 1 to 4, in making butt-weld tubing the multiple-length tube is welded and is delivered from the welding apparatus along the skids 18 to the lateral transfer mechanism 10, which by the chains 27, with their lugs 28, carries the tube upwardly into contact with and past the saw 11, where it is cut into sections without any stoppage of the movement of the tube. The two tube-sections so formed are delivered by the transfer mechanism onto the guides 19 and pass, according to the positions of the switch-guides 47, to the trough-guides 20 or 39 and into the feed-roll troughs 13 or 14 and are thence carried by the power-driven feed-rolls directly into the finishing-rolls, such as the sizing-rolls 37 or 38. Each tube as soon as it is formed can thus be carried automatically in continuous course from the welding apparatus, sawed into sections while at a very high heat, and fed in course to one or the other of the two different sets of finishing-rolls, there being no necessity for any hand-directed operations of any kind and there being no delays caused by either stoppage of the tube for sawing or any one tube waiting for the finishing of another. In case either set of rolls becomes inoperative the plant can be arranged to feed both tube-sections formed by sawing to the other set of finishing-rolls by the mere adjustment of the switch-guides 47. After the tubes pass through the sizing-rolls 37 or 38 they are carried by the troughs 52 or 53 to the cross-rolls 54 or 55 and delivered into the cross-roll troughs 56 or 57, and thence into the cooling-racks 58 or 59. These cooling-racks can be arranged in any suitable way, though the apparatus as illustrated provides a very compact plant.

With the apparatus illustrated in Figs. 1 to 6 and above described not only are the above advantages obtained, but I am enabled to employ the apparatus with the pivoted swinging draw-bench adapted to be brought into line with any blank in the welding-furnace and to provide for the lateral transfer of the multiple tubes from the welding apparatus in regular course for the same distance to the saw, and to deliver the tube-sections so cut from the multiple tubes to either of said finishing-rolls by the mere movement of a lever, the tubes traveling in regular fixed course and about the same distance to the troughs of each set of finishing-rolls, while the lateral course or travel from the saw to the finishing-roll troughs is left free by the support of the saw on the swinging platform beyond the outer finishing-roll trough. Such apparatus occupies less floor-space than any other form and makes it practicable to weld and saw the tubes on the traveling welding apparatus and yet deliver the tube-sections to finishing-rolls mounted in stationary bearings without regard to the position of the welding apparatus. I am also enabled with the two or more sets of finishing-roll troughs and finishing-rolls to properly feed the tube-sections to the finishing-rolls even though the troughs mounted on the welding apparatus swing at a considerable angle from a direct line leading thereto, as the wide-faced grooved feeding-roll at the end of each trough permits lateral bending or swing of the tube as it enters the funnel leading to the sizing-rolls. The tube is also supported across the necessary space between the end of the swinging feeding-roll trough and the funnel leading to the sizing-rolls, so that liability of its sagging down in passing over this space is overcome, while the supporting-guide for this purpose can be swung out of the way to give access to the apparatus, such as for repair. In case of a sticker access to the blank is easily obtained through the quick opening of the funnel leading to the sizing-rolls by raising the upper section thereof and swinging it to one side, as illustrated in Fig. 5. As the multiple tube is carried from the welding apparatus along the lateral transfer mechanism to the saw the air-blast pipe will cool the portion of the tube to be sawed, and thereby prevent the saw from forcing the body of the hot tube out of shape during the sawing operation.

In Fig. 7 I have shown a cross-section of the apparatus as arranged for use with a laterally-moving welding apparatus and stationary feeding-troughs leading to finishing-rolls in stationary bearings. It is particularly suitable for use with a bodily-moving welding apparatus—that is, a bench or other welding apparatus which moves on parallel lines in front of the furnace. I have illustrated a bodily-moving chain-draw bench 60 and stationary troughs 61 and 62, leading to stationary finishing-rolls and like apparatus, as shown in Figs. 1 and 2, these parts being marked as in those figures. Any suitable transfer mechanism from the bodily-moving bench to the stationary trough may be employed; but for that purpose I prefer to employ a suitable chain-transfer mechanism such as the chains 63, carrying lugs 64 and passing around power-driven sprocket-wheels 65, located in stationary bearings close to the inner stationary trough and from which like delivery-guides 19, switch-guides 47, and trough-guides 20 and 39 extend to the troughs 61 and 62. The bodily-traveling draw-bench 60 carries a series of sprocket-wheels 66, around which the transfer-chains 63 pass, and to enable the sprocket-chains to adapt themselves to the relative positions of the bodily-moving bench 60 and the stationary driving-sprockets 65 each sprocket-chain carries a suitable weight 67, arranged to take up the slack of the sprocket-chain. I have shown the preferable form in which this is accomplished, so as to prevent undue wear of the chain or swinging of parts in the lateral movement of the draw-bench. As illustrated in Figs. 7 and 8, each weight 67 is supported on a grooved pulley 68, hanging on the chain 63. The shaft 69 of each grooved pulley 68 travels in suitable vertical guides 70, so that the transfer-chain passes in course from the sprocket 66 over the driving-sprocket 65, carrying the welded tube past the saw, thence downwardly in vertical course around the grooved pulley 68, and thence back to the sprocket 66 on the draw-bench 60. The chains are thus held in proper course no matter what the position of the bench 60 may be, and the weighted pulleys rising and falling in the vertical guideways 70, as shown in Fig. 5. The weights 67 may pass into any suitable pits 71 below the mill-floor, if necessary. The saw 72 is supported on a suitable frame 73, secured to the mill-floor and projecting over both feeding-troughs 61 62 into the course of the chain-transfer mechanism, so that as the multiple-length tube is carried by the transfer mechanism from the bodily-moving bench to the stationary troughs it will be carried in course past the saw, be cut into sections, and the sections dropped along the guideways into the troughs 61 or 62, and pass thence to the finishing-rolls, the operation in this case being as rapid and having many of the special advantages above described in connection with the swinging frame carrying the welding apparatus, saw, and other parts.

What I claim is—

1. In apparatus for the manufacture of tubing, the combination of welding apparatus, a lateral transfer therefrom, and a cutter located at one side thereof in the course of the lateral transfer and adapted to cut the tube into sections.

2. In apparatus for the manufacture of tubing, the combination of welding apparatus, finishing-rolls and a feeding-trough therefor, power-driven transfer mechanism between the welding apparatus and trough, and a cutter located in the course of said transfer mechanism.

3. In apparatus for the manufacture of tubing, the combination of laterally-moving welding apparatus, finishing-rolls mounted in stationary bearings and a feeding-trough therefor, transfer mechanism between the welding apparatus and feeding-trough, and a cutter located in the course of the transfer mechanism between the welding apparatus and trough.

4. In apparatus for the manufacture of tubing, the combination of finishing-rolls and a feeding-trough therefor, transfer mechanism feeding to said trough, a cutter-frame supported beyond the trough and extending over the same and carrying a cutter located in the course of said transfer mechanism.

5. In apparatus for the manufacture of tubing, the combination of welding apparatus, two sets of finishing-rolls with feeding-troughs therefor, transfer mechanism between the welding apparatus and the nearest of said troughs, guides leading therefrom to said troughs, and a cutter-frame supported beyond the farthest feeding-trough and extending over the same above said guides and carrying a cutter in the course of the transfer mechanism.

6. In apparatus for the manufacture of tubing, the combination of rolls mounted in stationary bearings, a feeding-trough leading thereto, and a laterally-moving carriage or frame, said frame having supported thereon welding apparatus, and having also supported thereon a cutter adapted to cut the tubing into sections.

7. In apparatus for the manufacture of tubing, the combination of finishing-rolls, a feeding-trough therefor, a lateral transfer leading to said feeding-trough and a cutter in the course of said lateral transfer adapted to cut the tube into sections, the cutter-frame therefor being supported beyond the trough.

8. In apparatus for the manufacture of tubing, the combination of welding apparatus, finishing-rolls, transfer mechanism between the welding apparatus and finishing-rolls arranged to carry the welded tubing laterally, and a cutter located in the course of the lateral travel of the tubing.

9. In apparatus for the manufacture of tubing, the combination of welding apparatus, power-driven transfer mechanism arranged to carry the tubing laterally away from the welding apparatus, and a saw located in the course of the lateral travel of the tubing.

10. In apparatus for the manufacture of tubing, the combination of finishing-rolls, a cutter for severing the hot tube, transfer means constructed and arranged to support the tube while being severed and convey the sections thereof to the rolls, and means in front of and in line with the cutter for applying a cooling medium to the tube at the point where it is to be severed.

11. In apparatus for the manufacture of tubing, the combination of welding apparatus, transfer mechanism arranged to carry the tube laterally away from the welding apparatus, a saw located in the course of the lateral travel of the tube, and means between the welding apparatus and saw for applying a cooling medium to the tube at the point where it is to be severed.

12. In apparatus for the manufacture of tubing, the combination of welding apparatus, two sets of feeding-troughs at the side of the welding apparatus, finishing-rolls in line with the feeding-troughs, and a series of fixed guides and a series of switch-guides adapted to be arranged to feed the tubes into either feeding-trough.

13. In apparatus for the manufacture of tubing, the combination of welding apparatus, two sets of feeding-troughs at the side of the welding apparatus, finishing-rolls in line with the feeding-troughs, a cutter located between the welding apparatus and feeding-troughs, and a series of fixed guides and a series of switch-guides adapted to be arranged to feed the tube-sections to either trough.

14. In apparatus for the manufacture of tubing, the combination of finishing-rolls, a feeding-trough therefor, lateral transfer mechanism delivering to said trough, and a cutter located in the course of the transfer mechanism.

15. In apparatus for the manufacture of tubing, the combination of two sets of finishing-rolls and feeding-troughs therefor, and two sets of guides leading to said feeding-troughs, and movable switch-guides adapted to direct the tube into either of the troughs.

16. In apparatus for the manufacture of tubing, the combination of two sets of finishing-rolls and feeding-troughs therefor, guides leading to said troughs, and pivoted switch-guides adapted to close the passage to one of the troughs.

17. In apparatus for the manufacture of tubing, the combination of two sets of finishing-rolls and feeding-troughs therefor, and guides leading to said feeding-troughs, the guides to one trough having movable sections adapted to extend over and close the passage to the other trough.

18. In apparatus for the manufacture of tubing, the combination of two sets of finishing-rolls and feeding-troughs therefor, a delivery-guide extending in a downward incline above one feeding-trough, trough-guides extending downwardly in opposite directions toward both feeding-troughs and below the delivery-guides, and switch-guides adapted to connect said trough-guides with the delivery-guide.

19. In apparatus for the manufacture of tubing, the combination of two sets of finishing-rolls and feeding-troughs therefor, delivery-guides extending in a downward incline above one feeding-trough, trough-guides extending downwardly in opposite directions toward both feeding-troughs and below the delivery-guides, and switch-guides pivoted at the meeting-point of said trough-guides and adapted to extend over to said delivery-guides and close the passage to the nearest trough.

20. In apparatus for the manufacture of tubing, the combination of two sets of finishing-rolls and feeding-troughs therefor, delivery-guides extending in a downward incline above one feeding-trough, trough-guides extending downwardly in opposite directions toward both feeding-troughs and below the delivery-guides, and movable switch-guides connecting the delivery-guides and the trough-guides to the farthest trough, said delivery-guides, switch-guides and trough-guides forming a continuous inclined guideway to the farthest trough.

21. In apparatus for the manufacture of tubing, the combination of welding apparatus, a set of finishing-rolls and a feeding-trough therefor, inclined delivery-guides extending from the welding apparatus over said feeding-trough, and a trough-guide below the same and inclined in the opposite direction and leading to said feeding-trough.

22. In apparatus for the manufacture of tubing, the combination of a set of finishing-rolls and a feeding-trough therefor, inclined delivery-guides extending over said feeding-trough, a trough-guide below the same and inclined in the opposite direction and leading to said trough.

23. In apparatus for the manufacture of tubing, the combination of a set of finishing-rolls and a feeding-trough therefor, inclined delivery-guides extending over said feeding-trough, trough-guides below the same and inclined in the opposite direction and leading to said trough, and a switch closing the passage from one guide to the other.

24. In apparatus for the manufacture of double-length tubing, the combination of a set of finishing-rolls and a feeding-trough therefor, inclined delivery-guides extending over said feeding-trough, trough-guides below the same and inclined in the opposite direction and leading to said trough, the delivery-guides having longitudinally-adjustable extensions to regulate the passage between said delivery-guides and the oppositely-inclined trough-guides.

25. In apparatus for the manufacture of tubing, the combination of a pivoted draw-bench, a receiving-trough mounted on said draw-bench, stationary finishing-rolls, a guiding-funnel in front of said rolls, and power-driven grooved rolls in said receiving-trough, the end one of said rolls being provided with a wide flat-vased groove.

In testimony whereof I, the said PETER PATTERSON, have hereunto set my hand.

PETER PATTERSON.

Witnesses:
ROBERT C. TOTTEN,
G. C. RAYMOND.